Nov. 22, 1949     H. DIETLER     2,488,969
COMBINED GAS PRODUCER AND GAS TURBINE PLANT
Filed Feb. 26, 1946
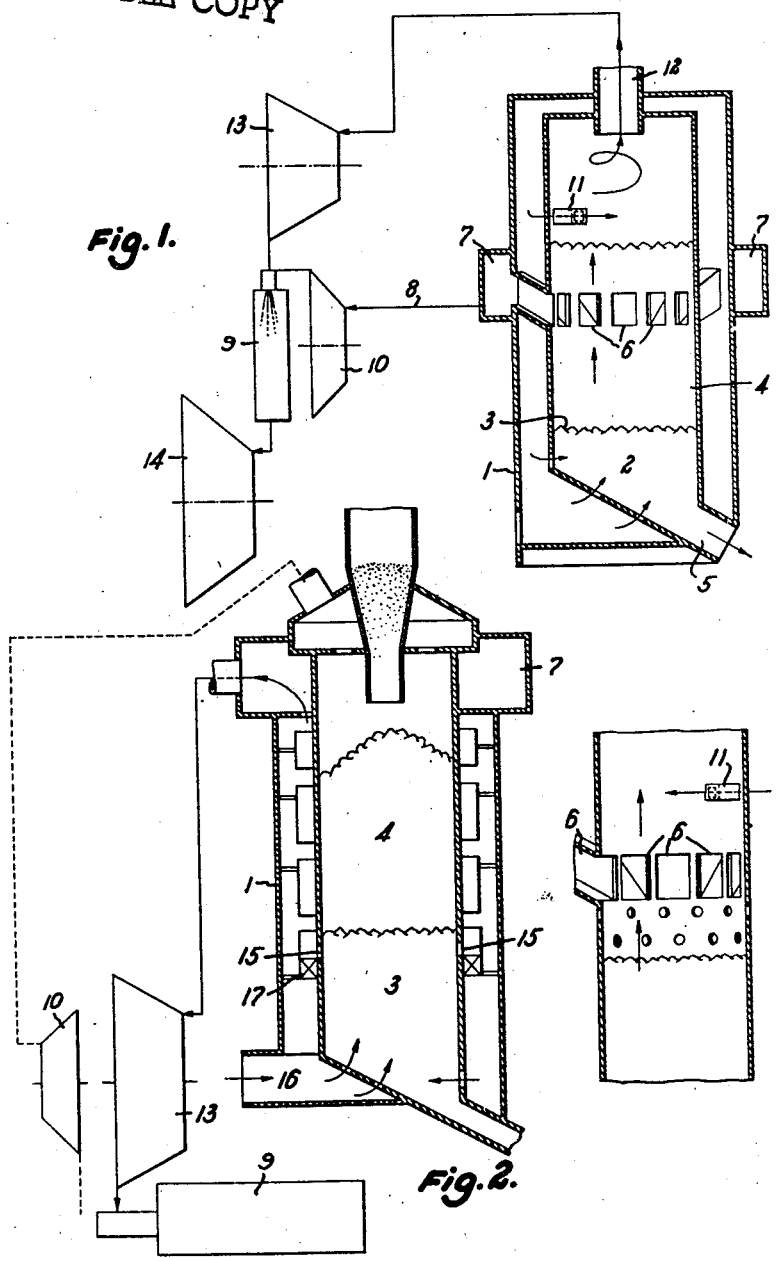

Patented Nov. 22, 1949

2,488,969

UNITED STATES PATENT OFFICE 2,488,969

COMBINED GAS PRODUCER AND GAS TURBINE PLANT

Hans Dietler, Wettingen, Switzerland, assignor to Aktiengesellschaft Brown, Boveri & Cie, Baden, Switzerland Application February 26, 1946, Serial No. 650,167
In Switzerland February 27, 1945

10 Claims. (Cl. 60—41)

In gas producers using solid fuels, it is usual for the solid fuel to be converted into a combustible gas whilst at the same time the chemically bound energy in the fuel is maintained as far as possible. Construction and method of operation depend primarily upon the composition and yield of the gas which is to be produced. The efficiency of the process increases as the amount of the original energy which is retained in the gas in chemical form increases, and as the amount of ballast, such as carbon dioxide, nitrogen and water vapour, contained in the gas decreases.

When gas producers are used to operate combustion turbines, the conditions are quite different. In this case the chief consideration is to convert the solid fuel as completely and as rapidly as possible into a dust-free gaseous product. Heat losses to the atmosphere must be kept as low as possible. It is, however, immaterial whether the original energy appears in a chemically bound form or as heat. It is only the latent heat in the water vapour which represents a loss. The increased temperature of the combustible gas, which in most gas producing plants is an undesirable feature, is, however, the final object of the gas producer-combustion turbine. The temperature region below 600° C., which it is difficult to utilize for gas producer operation, provides the main operating region for a gas turbine. In other words in accordance with the laws of chemical mass equilibrium the products of combustion ($CO_2$—$H_2O$—$SO_2$ etc.), all gaseous materials, which result from the gasification process, are already the final driving medium for the working machine. It is sufficient if these gases are mixed with the necessary quantity of working air in order to reduce it to the desired temperature. These gases are by no means undesirable byproducts as in the case of gas producers. The combustible gas supplied by the gas producers, mainly CO, $H_2$, carbohydrates, is an ideal fuel for all constant pressure combustion processes.

The present invention concerns a process for operating gas producers under pressure for solid fuels, particularly coal, in conjunction with multi-stage gas turbine plants with interstage heating of the driving medium, and the object is to improve the efficiency and specific output of the entire plant, and particularly to coordinate the gasification process, its products, and the most suitable design of gas producer with the operating process of the open combustion turbine, that is to utilize to the best possible advantage in the gas turbine operating process the special properties of a gaseous fuel produced under pressure.

With the process according to the invention all the combustible gas required for the heating and interstage heating is produced at full or nearly full operating pressure, whereupon part of the combustible gas is used for the direct heating of the working medium and part, after expansion in at least one combustion gas turbine, is passed to at least one intermediate heating device for the working medium.

By this means it is possible to reduce the dimensions and space requirements of the gas producer very considerably, and the gas producing process is accelerated by the high operating pressure. The quantity of gas used for the interstage heating can also be utilized to advantage to do useful work in a combustion gas turbine when it is expanded down to the medium pressure. The various combustible gas streams are expediently taken from the gas producer or producers at different shafts heights, whereby stability of the fuel bed, gas composition, gasification and extraction speed, temperature, as well as dust and tar content of the gas, can be influenced within wide limits. The plant for performing this process consists of at least one gas producer operating at a very high pressure to gasify solid fuels, particularly coal, the gas producer being constructed for multi-stage gas extraction and connected with a multi-stage gas turbine plant with interstage heating devices for the working medium.

Constructional examples of the invention are illustrated in the accompanying drawing.

Fig. 1 shows in longitudinal section a gas producer using coal as fuel, combustible gas being extracted from the reducing zone, and the fuel bed being stabilized by reducing the velocity with constant cross-section. The gas producer is connected to a gas turbine plant with interstage heating.

Fig. 2 shows in longitudinal section a gas producer with combustible gas extraction from the oxydizing zone, the producer also being connected to a gas turbine plant with intermediate heating of the working medium.

Fig. 3 shows an arrangement where the gas is extracted above the coal bed of a gas producer but below the point where the combustion and cooling air (mixing air) is introduced.

In Fig. 1 reference number 1 indicates a gas producer for solid fuels, particularly coal. The air for generating the gas enters at 2 below the grate and passes upwards through the oxydizing zone 3, above which there is the reducing zone 4. Reference number 5 indicates the path to the slag extractor. The first extraction of gas occurs at the gasifying zone 4 by way of the openings 6, annular channel 7 and pipe 8, the gas being passed to the intermediate combustion chamber 9. The extracted gas, on its way to the intermediate combustion chamber 9 working at medium pressure, can be put to do useful work in a separate turbine 10, or it can be used for being introduced into different stages of turbine 13 with the purpose of obtaining in this turbine as nearly as possible an isothermic expansion, i. e. an expansion at constant temperature, and of increasing thus the efficiency of the process, or its pressure drop can be utilized in a dust separator with the purpose of obtaining clean driving gases for turbine 14. The rest of the combustible gas passes through the entire bed of coal and is completely burned with the working air which enters at 11, and is also cooled down to the working temperature. The supply of combustion and cooling air can be so arranged that the ash and slag from the coal is separated out from the working gas stream. The gas leaves the generator at 12 and is utilized first of all in a high pressure turbine 13, then heated again in the aforementioned intermediate combustion chamber 9, and further employed in a medium or low pressure turbine 14 and so on. The air and gas velocities in the gas producer decrease rapidly in the upward direction when the cross-section remains constant and this effects a stabilization of the fuel bed.

On the other hand, the gas required for forming, together with the compressed working air, the driving medium for the high pressure turbine 13, can be taken, at openings 15 as shown in Figure 2, from the lower-lying oxidizing zone 3 at a relatively high temperature. When this gas is being mixed with the working air having the highest pressure of the gas turbine process and which arrives at 16 from a compressor and an air preheater not shown in the drawing, practically no combustion occurs, but its temperature is reduced to the desired working temperature of the high pressure gas turbine 13. A mixing device for admitting cooling air is indicated at 17. The remainder of the gases produced at the oxidizing zone 3 pass through the higher-lying reducing zone 4 and leave the gas producer through an outlet opening at the top. These combustible gases are then used for reheating in an intermediate combustion chamber 9 the driving medium of the high pressure gas turbine 13, the gases being first passed through a separate gas turbine 10 to extract useful work. If desired, the latter turbine can be deleted in which case the combustible gases would then be fed directly to the intermediate combustion chamber 9. The reheated driving medium of turbine 13 then passes to one or more low pressure turbines not shown in the drawing.

Both processes enable the gas producer to be subjected to a considerably higher load, due to the lower highly loaded coal layer (high air velocity) having an upper lightly loaded coal layer pressing on it thus preventing the formation of coal dust eddies. The upper coal layer acts like a mechanical dust filter through which the gas passes at a low velocity. The path from the gas extraction point (15) up to the entrance to the annular channel 7 is constructed so as to separate the dust.

Even when as in Fig. 3 the extraction point for the combustible gas is located above the fuel bed but below the mixing air inlet 11, there is still a strong separating effect on the moving coal particles, because the velocity of the gas drops to about half its former value.

With the process according to Figure 1, the gas extracted at openings 6 contains considerable quantities of dust, which may make it necessary to use a specially constructed turbine, with protective means against erosion, for expanding it down to the intermediate pressure or pressures, or which may even make it advisable to provide a dust separator instead of a turbine.

With the process according to Figure 2, the gas for the interstage heating extracted at the top of the gas producer is very pure, so that it can be used to do work in a turbine without being further cleaned. In this case the cooling air supply can be used in a suitable manner for separating out the dust. This process possesses the advantage that the working medium of the high pressure stage suffers the smallest pressure loss, because it only passes through the combustion and not the gasifying zone.

In all cases the extraction ducts 6 are so arranged and dimensioned that the suction direction is approximately perpendicular to the average direction of flow and so that the suction velocity remains small (height of ducts). By this means it is possible for the coal bed to have a high filtering effect on the extracted gas.

I claim:

1. In a plant of the class described, a multi-stage turbine unit having an interstage heating device, a gas producer for converting solid fuels such as coal to gas and which is arranged to be operated at the highest pressure of the turbine unit, means for extracting gases from said producer at different zones therein, means conveying gases extracted from one of said zones to a high pressure turbine stage, and means conveying gases extracted from another of said zones to said interstage heating device.

2. In a plant of the class described, a multi-stage turbine unit having an interstage heating device, a gas producer for converting solid fuels such as coal to gas and which is arranged to be operated at the highest pressure of the turbine unit, means conveying combustible gases extracted from a reducing zone in the fuel bed in said producer to said interstage heating device, and means conveying combustion gases extracted from above the fuel bed and combined with cooling air to a high pressure turbine stage.

3. In a plant of the class described, a multi-stage turbine unit having an interstage heating device, a gas producer for converting solid fuels such as coal to gas and which is arranged to be operated at the highest pressure of the turbine unit, means conveying combustible gases extracted from an oxydizing zone in the fuel bed in said producer and combined with cooling air to a high pressure turbine stage, and means conveying gases extracted from above the fuel bed to said interstage heating device.

4. In a plant of the class described, a multi-stage turbine unit having an interstage heating device, a gas producer for converting solid fuels such as coal to gas and which is arranged to be operated at the highest pressure of the turbine unit, means conveying combustible gases extracted from a zone in said producer above the fuel bed to said interstage heating device, means for introducing cooling air into said producer above said extraction zone, and means extracting and conveying combustion gases combined with said cooling air to a high pressure turbine stage.

5. A plant as defined in claim 1 and which further includes an additional turbine interposed in the gas conveying means to said interstage heating device.

6. A plant as defined in claim 3 wherein said gas producer is comprised of vertically arranged inner and outer walls defining a dust chamber therebetween through which said combustible gases are passed.

7. A plant as defined in claim 2 wherein said combustible gases are extracted from the reducing zone through a plurality of spaced ducts in the periphery of a vertical wall in the producer confining the fuel bed, said ducts being of such outlet area that the suction direction therethrough is substantially perpendicular to the average direction of gas flow upwardly through the producer and that the velocity of the extracted gases is maintained at a relatively low value to minimize the carrying away of fuel particles.

8. A gas producer for use with multistage turbine units comprising, a vertical casing within which a bed of fuel to be gasified is to be maintained, an inlet for pressure air beneath the fuel bed, an extraction duct for combustible gases at the reducing zone in the fuel bed, an inlet for admitting cooling air into said casing above the fuel bed, and an extraction duct above the fuel bed for combustion gases combined with said cooling air.

9. A gas producer for use with multistage turbine units comprising, a vertical casing within which a bed of fuel to be gasified is to be maintained, an inlet for pressure air beneath the fuel bed, an extraction duct for combustible gases at the oxydizing zone in the fuel bed, an inlet for introducing cooling air into said duct to combine with said combustible gases, and a gas extraction duct above the fuel bed.

10. A gas producer for use with multistage turbine units comprising, a vertical casing within which a bed of fuel to be gasified is to be maintained, an inlet for pressure air beneath the fuel bed, an extraction duct for combustible gases above the fuel bed, an inlet for admitting cooling air into said casing above said extraction duct, and a second extraction duct above said cooling air inlet for gases combined with the cooling air.

HANS DIETLER.

REFERENCES CITED

The following references are of record in the file of this patent:

UNITED STATES PATENTS

| Number | Name | Date |
|---|---|---|
| 2,225,310 | Lindhagen et al. | Dec. 17, 1940 |
| 2,225,311 | Lysholm | Dec. 17, 1940 |